United States Patent
Ott

(10) Patent No.: US 11,667,526 B2
(45) Date of Patent: Jun. 6, 2023

(54) PROCESS AND PLANT FOR PRODUCING A SYNTHESIS GAS PRODUCT STREAM HAVING AN ADJUSTABLE H₂/CO RATIO AND A PURE HYDROGEN STREAM

(71) Applicant: L'Air Liquide, Société Anonyme pour l'Etude et l'Exploitation des Procédés Georges Claude, Paris (FR)

(72) Inventor: Joerg Ott, Frankfurt am Main (DE)

(73) Assignee: L'Air Liquide, Société Anonyme pour l'Etude et l'Exploitation des Procédés Georges Claude, Paris (FR)

(*) Notice: Subject to any disclaimer, the term of this patent is extended or adjusted under 35 U.S.C. 154(b) by 112 days.

(21) Appl. No.: 17/117,526

(22) Filed: Dec. 10, 2020

(65) Prior Publication Data
US 2021/0179425 A1    Jun. 17, 2021

(30) Foreign Application Priority Data

Dec. 11, 2019 (EP) .................................. 19020688

(51) Int. Cl.
*C01B 3/50* (2006.01)
*C01B 3/32* (2006.01)

(52) U.S. Cl.
CPC ............... *C01B 3/508* (2013.01); *C01B 3/32* (2013.01); *C01B 3/501* (2013.01);
(Continued)

(58) Field of Classification Search
CPC .. C01B 3/508; C01B 3/32; C01B 3/51; C01B 2203/0216; C01B 2203/0244;
(Continued)

(56) References Cited

U.S. PATENT DOCUMENTS

| 5,888,470 A | 3/1999 | Engler et al. |
| 2006/0194889 A1 | 8/2006 | Guo et al. |

(Continued)

OTHER PUBLICATIONS

Ullmann's Encyclopedia of Industrial Chemistry, B. Elvers, S. Hawkins, M. Ravenscroft, J.F. Rounsaville, G. Schulz, eds., 5th (1996) and 6th (2000) editions, 1-2, 77-82, 161-162, 270-271, 399-407.

(Continued)

*Primary Examiner* — Jafar F Parsa
(74) *Attorney, Agent, or Firm* — Elwood L. Haynes

(57) ABSTRACT

Proposed are a process and a plant for producing a synthesis gas product stream having an adjustable H₂/CO ratio and a pure hydrogen stream, wherein it is provided according to the invention that a substream of a deacidified synthesis gas stream is supplied to a membrane separation plant fitted with a hydrogen-selective membrane and the remaining substream is supplied to a pressure swing adsorption plant, wherein the latter affords a pure hydrogen stream and a fuel gas stream. The hydrogen-enriched permeate stream obtained from the membrane separation is likewise supplied to the pressure swing adsorption plant, thus enhancing the yield of pure hydrogen. The hydrogen-depleted retentate stream obtained from the membrane separation is discharged as a synthesis gas product stream and if of a suitable composition may be utilized as oxo gas.

11 Claims, 4 Drawing Sheets

(52) U.S. Cl.
CPC ............... *C01B 2203/0216* (2013.01); *C01B 2203/0244* (2013.01); *C01B 2203/0255* (2013.01); *C01B 2203/043* (2013.01); *C01B 2203/0405* (2013.01); *C01B 2203/0415* (2013.01); *C01B 2203/0425* (2013.01); *C01B 2203/147* (2013.01); *C01B 2203/168* (2013.01)

(58) Field of Classification Search
CPC .... C01B 2203/0255; C01B 2203/0405; C01B 2203/0415; C01B 2203/0425; C01B 2203/168
See application file for complete search history.

(56) References Cited

U.S. PATENT DOCUMENTS

| | | |
|---|---|---|
| 2008/0272340 A1 | 11/2008 | Koh |
| 2011/0271714 A1 | 11/2011 | Reddy et al. |
| 2020/0392416 A1* | 12/2020 | Marker .................... C10L 3/08 |

OTHER PUBLICATIONS

Gasification, C. Higman and M. van der Burgt, eds., Ch. 8.2.3, Adsorption systems, Gulf Professional Publishing, Burlington, MA (2003), 340-343.

Rahbari, A. et al., Combined steam reforming of methane and formic acid to produce syngas with an adjustable $H_2$:CO ratio, Ind. Eng. Chem. Res. 2018, 57, 10663-10674.

Wikipedia, Hydroformylation, downloaded from URL: https://en.wikipedia.org/wiki/Hydroformylation#:~:text=Hydroformylation%2C%20also%20known%20as%20oxo,a%20carbon%2Dcarbon%20double%20bond. on Nov. 11, 2020.

European Search Report for corresponding EP 19020688, dated May 20, 2020.

* cited by examiner

PROCESS AND PLANT FOR PRODUCING A SYNTHESIS GAS PRODUCT STREAM HAVING AN ADJUSTABLE H₂/CO RATIO AND A PURE HYDROGEN STREAM

CROSS REFERENCE TO RELATED APPLICATION

This application claims the benefit of priority under 35 U.S.C § 119 (a) and (b) to European patent application No. EP19020688.8, filed Dec. 11, 2019, the entire contents of which are incorporated herein by reference.

FIELD OF THE INVENTION

The invention relates to a process and a plant for producing a synthesis gas product stream having an adjustable hydrogen-carbon monoxide ratio and a pure hydrogen stream from an input stream comprising hydrocarbons by means of a reforming process (steam reforming, autothermal reforming) or a partial oxidation process or mixtures of these processes.

The invention further relates to the use of such a process/such a plant for producing a synthesis gas product stream suitable as oxo gas.

BACKGROUND OF THE INVENTION

Synthesis gases are gas mixtures containing hydrogen and carbon oxides which are used in various synthesis reactions. Examples thereof are methanol synthesis, oxo synthesis or Fischer-Tropsch synthesis.

According to the online encyclopedia "Wikipedia", keyword hydroformylation, retrieved on 13 Nov. 2019, oxo synthesis is an industrially important, homogeneously catalyzed reaction of olefins with carbon monoxide and hydrogen which proceeds according to the following general reaction equation, from which it is apparent that, stoichiometrically, oxo synthesis requires a synthesis gas having equimolar carbon monoxide and hydrogen contents.

$$C_nH_{2n}+CO+H_2=C_nH_{2n+1}CHO$$

In practice, a molar ratio of hydrogen to carbon monoxide of 1.5 mol/mol is desired. The excess hydrogen is consumed in the simultaneous hydrogenation of the aldehydes to alcohols.

The primary products of hydroformylation are aldehydes having one carbon atom more than the starting olefin. These aldehydes are used for producing a multiplicity of consecutive products and are often initially hydrogenated to afford the corresponding alcohols. Important industrial products of hydroformylation are 1-butanol und 2-ethylhexanol which are both obtained from propene. The hydroformylation catalysts employed on a large industrial scale are organometallic cobalt or rhodium compounds. The industrial process is performed at pressures of about 10 bar to 100 bar and temperatures between 40° C. and 200° C. The overall capacity of existing hydroformylation plants is several million tons per annum.

Contemplated processes for producing the required synthesis gas include in principle all synthesis processes that are known and employed in industrial production, i.e. especially steam reforming of hydrocarbons, in particular of natural gas (steam methane reforming, SMR) or for example also of naphtha or refinery residues, noncatalytic partial oxidation of hydrocarbons (POX) or autothermal reforming as a hybrid of the two preceding processes.

In addition to the differences in processing, the produced synthesis gas products also exhibit differences in their composition, in particular in the obtained hydrogen-carbon monoxide (H₂/CO) ratio. Proceeding from methane as the simplest hydrocarbon to be employed, the gross reaction equations of these processes are as follows:

| | | |
|---|---|---|
| $2\ CH_4 + O_2$ | $= 2\ CO + 4\ H_2$ | (partial oxidation) |
| $2\ CH_4 + \frac{1}{2}O_2 + H_2O$ | $= 2\ CO + 5\ H_2$ | (autothermal reforming) |
| $2\ CH_4 + 2\ H_2O$ | $= 2\ CO + 6\ H_2$ | (pure steam reforming) |

Accordingly, none of the processes considered per se afford a synthesis gas product having the desired stoichiometric H₂/CO ratio/only a slight hydrogen excess. In order to obtain a synthesis gas product employable for oxo synthesis it is therefore necessary to separate a portion of the hydrogen, especially if during workup or further processing of the raw synthesis gases obtained from the abovementioned processes the hydrogen content is further increased. One example of such further processing is the CO conversion reaction, also known as the water-gas shift reaction (WGS) or CO shift reaction, according to the reaction equation $$CO+H_2O=CO_2+H_2$$

Addition of steam causes the CO to react to afford CO₂ and H₂. Due to the reaction enthalpy of −41.2 kJ/mol, increasing temperature shifts the chemical equilibrium from the reaction products towards the reaction reactants. Depending on the employed reaction temperature, the reaction is referred to as a high temperature shift (HTS), medium temperature shift (MTS) or low temperature shift (LTS). Depending on the type of catalysts employed, it is further also possible to perform the shift reaction with the unpurified raw synthesis gas. This process is referred to as raw gas shift or else—on account of the acidic gas constituents, namely CO₂ and H₂S—as sour gas shift.

The further workup of the produced raw synthesis gas usually also comprises a process for removing further unwanted concomitants, for example by physical or chemical absorption or gas scrubbing. Thus such processes may be used to safely remove down to the trace range unwanted, acidic constituents of raw synthesis gases produced by gasification or reforming of carbon-containing inputs, for example carbon dioxide (CO₂) and hydrogen sulfide (H₂S), but also further constituents such as carbonyl sulfide (COS), hydrogen cyanide (HCN) or mercaptans (RSH), from the wanted synthesis gas constituents hydrogen and carbon monoxide. A known and often employed process is the Rectisol process which comprises a scrubbing of the raw synthesis gas with cryogenic methanol as the absorbent and is likewise described in principle in the abovementioned document.

Cryogenic gas fractionation (so-called coldbox) may also be used to remove traces of higher hydrocarbons or of carbon monoxide. This typically employs mainly liquid methane or liquid nitrogen to absorb higher boiling gases such as carbon monoxide.

To produce pure hydrogen this is typically followed by a final step of treatment of the crude hydrogen stream in a plant for pressure swing adsorption (PSA). Its optimal operating pressure is between 15 and 30 bar, this then allowing hydrogen yields between 80% and 92% to be achieved. At higher operating pressures the hydrogen yield recedes. The temperature of the PSA feed gas is typically below 40° C. and any condensate formed is separated beforehand.

The pressure swing adsorption uses molecular sieves as adsorbents in a series of containers operated in a staggered cyclic mode which switches between an adsorption phase and different phases of regeneration. Regeneration of the laden adsorbent is carried out by stepwise depressurization and through the use of the gas from this operation to purge other adsorbers in the regeneration cycle at a different pressure level. Depending on the number of absorbers in a line, the hydrogen recovery may be up to 90% and up to 10%. It is possible to achieve a very high purity with about 50 ppm of argon and less than 10 ppm of other impurities.

Production of a synthesis gas product employable for oxo synthesis in addition to a pure hydrogen product is described for example in US patent application US 2008/0272340 A1. The invention disclosed therein relates to a process for producing synthesis gas from hydrocarbons. In one embodiment of that invention the synthesis gas production unit comprises an apparatus for adjusting the $H_2/CO$ molar ratio of the synthesis gas, for example for producing oxo gas. This apparatus comprises a hydrogen-permeable membrane, wherein the hydrogen selectivity of the membrane is said to allow adjustment of the desired $H_2/CO$ molar ratio. The membrane separation of the raw synthesis gas further affords a hydrogen permeate which is utilized as a fuel, for example in a combined heat and power plant. The disadvantage here is the adjustment, in particular fine adjustment of the $H_2/CO$ molar ratio, which is possible only at great inconvenience by exchange of the separation membrane and replacement with another membrane which allows adjustment of the desired $H_2/CO$ molar ratio by virtue of its altered hydrogen selectivity. The permeate stream enriched in hydrogen compared to the raw synthesis gas and obtained as a byproduct is merely sent for thermal utilization as fuel. By contrast, production of a synthesis gas product of adjustable composition and of a pure hydrogen product is not disclosed.

SUMMARY OF THE INVENTION

The present invention accordingly has for its object to specify a process and a plant for producing a synthesis gas product stream having an adjustable $H_2/CO$ ratio and a pure hydrogen stream which do not exhibit the recited disadvantages of the prior art.

This object is solved in a first aspect by a process having the features of Claim 1 and with a plant having the features of Claim 12. Further embodiments of the invention are apparent from the subsidiary claims of the respective category. The invention further relates to the use of the process or the plant according to the invention for producing a synthesis gas product stream suitable as oxo gas.

The synthesis gas production conditions, i.e. the reaction and process conditions suitable for performing steam reforming, autothermal reforming (ATR) or partial, noncatalytic oxidation, are known to those skilled in the art from the prior art, for example the documents recited at the outset. These are the physicochemical conditions under which a measurable, preferably industrially relevant, conversion of hydrocarbons to synthesis gas products is achieved. Necessary adjustments of these conditions to the respective operational requirements will be made on the basis of routine experiments. Any specific reaction conditions disclosed may serve here as a guide, but they should not be regarded as limiting in relation to the scope of the invention. The same applies to CO conversion conditions.

A sorption apparatus is to be understood as meaning an apparatus determined and suitable for separation of matter by physical or chemical adsorption or absorption processes, wherein adsorption is to be understood as meaning adhesion to a surface and absorption is to be understood as meaning admission into a phase volume. In chemical sorption the bonding of the component to be sorbed to the sorption medium or sorbent is effected by specific chemical interactions of any type, i.e. for example by covalent bonds or hydrogen bonds. All other, non-chemical sorption processes are to be understood as meaning physical sorption processes.

In the context of the present invention a division or resolution/separation of a material stream is to be understood as meaning production of at least two substreams from the original material stream, wherein resolution/separation is associated with an intentional alteration of the composition of matter of the obtained substreams with respect to the original material stream, for example through application of a thermal separation process to the original material stream. By contrast, division of the original material stream is generally not associated with a change in the composition of matter of the obtained substreams.

The indication that a material stream is to be directly supplied to a specific process stage or a specific plant part is to be understood as meaning that the material stream is introduced into this process stage or this plant part without previously having been passed through other process stages or plant parts with the exception of purely transportational operations and the means required therefor, for example pipelines, valves, pumps, compressors, reservoirs.

All approximate pressures are reported in absolute pressure units, or in gauge pressure units, barg for short, unless otherwise stated in the particular individual context.

Fluid connection between two regions of the apparatus according to the invention is to be understood as meaning any type of connection whatsoever which makes it possible for a fluid, for example a gas stream, to flow from the one to the other of the two regions, neglecting any interposed regions or components.

A means is to be understood as meaning something that enables or is helpful in the achievement of a goal. In particular, means for performing a particular process step are to be understood as including all physical articles that would be considered by a person skilled in the art in order to be able to perform this process step. For example, a person skilled in the art will consider means of introducing or discharging a material stream to include all transporting and conveying apparatuses, i.e. for example pipelines, pumps, compressors, valves, which seem necessary or sensible to said skilled person for performance of this process step on the basis of his knowledge of the art.

A synthesis gas product stream suitable as oxo gas for oxo synthesis is to be understood as meaning a synthesis gas product stream which meets the requirements of a specified molar $H_2/CO$ ratio. This is especially the case when the $H_2/CO$ ratio of the synthesis gas product stream is between 1.25 and 0.75 mol/mol. In oxo synthesis industrial practice a molar ratio of hydrogen to carbon monoxide of for example 1.5 mol/mol is desired. The hydrogen present in excess with respect to the stoichiometry of the hydroformylation reaction is consumed in the simultaneous hydrogenation of the aldehydes to alcohols.

In a preferred embodiment the invention relates to producing a hydrogen-rich synthesis gas mixture by partial oxidation, allothermal or autothermal steam reforming of hydrocarbon-containing inputs, followed by partial CO conversion (water-gas shift conversion), separation of acidic gas constituents such as $CO_2$ and optionally $H_2S$ by means of a sorption process, for example by means of a gas scrubbing process such as the Rectisol process, and resolution of this synthesis gas mixture into a synthesis gas employable for example for oxo synthesis and pure hydrogen via a combination of two hydrogen enrichment stages configured as a membrane separation and a pressure swing adsorption. This process differs from processes of the prior art by eschewing costly separating operations such as cryogenic gas fractionation processes or separate workup of the raw gas from the gas production for the respective target products.

The first hydrogen enrichment stage which is configured as a membrane separation makes it possible to produce a synthesis gas product having the desired composition directly as the retentate from hydrogen-rich raw synthesis gas at high product pressure. The permeate enriched in hydrogen compared to the raw synthesis gas, optionally mixed with a substream of the input gas and/or compressed, is worked up to hydrogen of high purity using the second hydrogen enrichment stage, a pressure swing adsorption (PSA). The residue from the pressure swing adsorption may be compressed and combined with the synthesis gas product or otherwise employed, for example as fuel gas.

The prior art employs the following process sequences for producing synthesis gas products with or without coproduction of pure hydrogen:

(a) synthesis gas production, optionally partial water-gas shift conversion, $CO_2$ separation, cryogenic fractionation for separation of hydrogen and CO to adjust the $H_2$/CO ratio in the synthesis gas product (for example oxo gas), PSA for purification of the remaining hydrogen. The disadvantage here is the use of the costly and highly complex cryogenic fractionation process.

(b) synthesis gas production, optionally partial water-gas shift conversion, $CO_2$ separation, PSA for separating the synthesis gas product at a particular $H_2$/CO ratio and simultaneous purification of the hydrogen to obtain pure hydrogen. The disadvantage here is that due to the low operating pressure of the PSA the synthesis gas product, for example oxo gas, is obtained at low pressure and must be compressed for subsequent use. Furthermore, purity requirements for the synthesis gas product are often not achievable since it is obtained essentially as a waste product of the PSA and the cyclic operation of the PSA often leads to temporal fluctuations in the composition of the synthesis gas product. Finally, low availability due to the combination of PSA and a compressor is also a disadvantage. The PSA process is based on a large number of active control components, for example fast-switching valves which are prone to wear and thus failure. This is compensated by an emergency operating mode, for example an emergency operation with only a fraction of the customary number of individual adsorbers in the overall plant. Pure hydrogen is obtained in the required purity but only at reduced capacity. However, this reduces the pure hydrogen yield and the composition of the synthesis gas product is thus markedly altered.

Due to the multiplicity of moving mechanical elements, compressors are generally high-risk components and are therefore often configured with multiple redundancy to prevent lengthier plant shutdowns. This results in elevated capital costs. In addition, switching over to the backup compressor often cannot prevent a plant outage and restart. The redundancy primarily serves to prevent multi-week shutdowns.

(c) synthesis gas production, resolution of the raw synthesis gas into two substreams, complete water-gas shift conversion, $CO_2$ and optionally $H_2S$ separation, purification of the first substream to afford pure hydrogen by PSA, separate $CO_2$ and optionally $H_2S$ separation to afford the synthesis gas product for the second substream. Disadvantages here are especially the specifically high capital costs for the treatment of the synthesis gas product stream, especially in the case of coproduction of a small amount of the synthesis gas product and a large amount of pure hydrogen. There is only limited flexibility to vary the product quantities and there is no direct option for influencing the $H_2$/CO ratio in the synthesis gas product. Further disadvantages include the high complexity of the process chain and the considerable costs resulting from measures for ensuring a high availability of the synthesis gas product.

Especially the combination of a synthesis gas production based on a noncatalytic partial oxidation with a gas purification, for example by physical gas scrubbing, makes it possible in simple fashion to obtain an $H_2$/CO mixture having a very low proportion of impurities. However, if hydrogen is the main product of the process circuit to be optimized, the subsequent efficient separation of a comparatively small stream having a low $H_2$/CO ratio is difficult. Contrary to original expectations, it was found here that a membrane separation is very well suited to this task, wherein the permeate is surprisingly obtained at a comparatively high pressure and is thus well suited for further purification to afford hydrogen.

The process and plant according to the invention feature high flexibility. They allow adaptation of the $H_2$/CO ratio in the raw synthesis gas by partial water-gas shift conversion with a bypass in the interaction with the first and second hydrogen enrichment stage, especially by adjusting/varying the pressure and quantity flow ratios in the hydrogen enrichment stages configured as a membrane separating apparatus and a PSA. The compressor output may be minimized according to the requirements on the quantity ratios of the products.

Synthesis gas is produced by partial oxidation or steam reforming or autothermal reforming of hydrocarbon-containing input materials. The obtained raw synthesis gas is typically used to establish a molar ratio of hydrogen to carbon monoxide which corresponds to the sum of the desired product streams by CO conversion (water-gas shift reaction) with a suitable number of conversion stages, typically 1 to 3 conversion stages, and optionally a bypass of unconverted raw synthesis gas past the CO conversion stages. A suitable process, for example a chemical or physical scrubbing, is used to separate acidic gas constituents such as $CO_2$ and optionally $H_2S$ from this hydrogen-enriched raw synthesis gas. The $CO_2$ content of the thus purified gas is guided by the required purity for the synthesis gas product and may be in the range from 1 to 100 ppmv when used as oxo gas for example. The pressure of the purified synthesis gas stream is guided by the choice of the process for synthesis gas production and the desired delivery pressure for the synthesis gas product and may be in the range of 50 bar when used as oxo gas for example. One example thereof is the production of high pressure oxo gas by POX.

A substream of the deacidified synthesis gas is supplied to a membrane unit and optionally heated or cooled to a temperature suitable for the membrane separation process, for example 80° C. Through choice of membrane type and permeate pressure, the $H_2$/CO ratio in the retentate is adjusted according to the product specification, for example in a range from 0.75 to 1.25, for many applications 1.0, for other applications 1.5. This may optionally be followed by a fine purification of the oxo gas obtained as retentate, for example through removal of traces of $CO_2$ by a suitable process such as temperature swing adsorption.

In case of correspondingly high demands in respect of the hydrogen delivery pressure or to optimize the efficiency and costs of the PSA unit, the permeate from the membrane separation unit which is typically generated at a pressure of 10 to 30 bar is compressed, for example to a level corresponding to the synthesis gas pressure of about 50 bar. Depending on the requirements in respect of hydrogen product quantity, the permeate may be combined with a substream of the deacidified synthesis gas from the $CO_2$ separation and is supplied to the PSA unit for purification of the hydrogen. The purity of the resulting hydrogen stream is typically 99.9% and the recovery rate of the PSA unit in the range from 80% to more than 90%. The residual gas generated at low pressure may be used as fuel gas, optionally after compression. Since, through suitable choice of the distribution of the synthesis gas to membrane separation and PSA separation and further process parameters such as pressure ratios, the quality and composition of this residual gas can also approach that of the synthesis gas product stream obtained from the membrane separation unit, a compressing and combining with the synthesis gas product stream, optionally with separate or joint fine purification as described above, is optionally also possible. The type and concentrations of the possible impurity components may vary. It may therefore be possible to purify one or both streams separately before combination, or alternatively to purify the combined stream jointly, if for example the impurities are very similar. The fine purification often employs comparatively costly solid adsorbents; the gas stream to be treated should therefore ideally be as small as possible and the concentration of the components to be removed as high as possible. Dilution of the stream to be purified with an already comparatively clean stream results in cost increases since larger adsorbent amounts and larger containers are required. In this case especially the overall output of the compressors is an important optimization parameter when choosing the process parameters for the membrane-PSA combination.

A second aspect of the process according to the invention is characterized in that the proportion 1, i.e. the proportion of the raw synthesis gas stream passed to the CO conversion plant, is between 0% and 100% of the raw synthesis gas stream and/or the proportion 2, i.e. the proportion of the deacidified synthesis gas stream passed to the first hydrogen enrichment stage, is between 0% and 100% of the deacidified synthesis gas stream. This allows the composition of the synthesis gas product to be altered and adjusted within wide limits.

A third aspect of the process according to the invention is characterized in that a proportion 3 of the carbon monoxide-containing residual gas stream is passed into the synthesis gas product stream and the proportion 1 and/or the proportion 2 and/or the proportion 3 are chosen such that the $H_2/CO$ ratio required for the synthesis gas product stream is obtained. This allows the composition of the synthesis gas product to be altered and adjusted in targeted fashion, for example to produce an oxo gas having a predefined composition.

A fourth aspect of the process according to the invention is characterized in that the proportion 1 is between 0% and 100% of the raw synthesis gas stream and/or the proportion 2 is between 0% and 100% of the deacidified synthesis gas stream and/or the proportion 3 is between 0% and 100% of the carbon monoxide-containing residual gas stream. This results in additional degrees of freedom for adjustment of the composition of the synthesis gas product within wide limits.

A fifth aspect of the process according to the invention is characterized in that the molar $H_2/CO$ ratio of the synthesis gas product stream is between 10 and 0.1 mol/mol, preferably between 5 and 0.5 mol/mol, more preferably between 2 and 1 mol/mol, most preferably between 1.25 and 0.75 mol/mol. It is accordingly possible to establish in targeted fashion the respective optimal composition for different processes requiring synthesis gas of varying composition as the input, for example methanol synthesis, Fischer-Tropsch synthesis or oxo synthesis.

A sixth aspect of the process according to the invention is characterized in that the raw synthesis gas stream less proportion 1 is directly supplied to the sorption apparatus. Since this comprises passing this material stream straight to the sorption apparatus without first passing it through other process stages or plant parts, undesired changes in the synthesis gas composition are avoided, hydrogen loss and pressure drop are minimized and the yield of pure hydrogen from the process and its energy efficiency are increased.

A seventh aspect of the process according to the invention is characterized in that the deacidified synthesis gas stream less proportion 2 is directly supplied to the second hydrogen enrichment stage. Since this comprises passing this material stream straight to the second hydrogen enrichment stage without first passing it through other process stages or plant parts, undesired changes in the synthesis gas composition are avoided, hydrogen loss and pressure drop are minimized and the yield of pure hydrogen from the process and its energy efficiency are increased.

An eighth aspect of the process according to the invention is characterized in that the residual gas stream less proportion 3 is discharged from the process as fuel gas. This makes it possible to achieve disposal and thermal utilization of a residue stream.

A ninth aspect of the process according to the invention is characterized in that the carbon monoxide-containing residual gas stream is compressed before supplying to the synthesis gas product stream. This makes it possible to achieve disposal and material utilization of a residue stream.

A tenth aspect of the process according to the invention is characterized in that the carbon monoxide-containing residual gas stream is supplied to a fine purification stage before supplying to the synthesis gas product stream or is supplied to a joint fine purification stage after supplying to the synthesis gas product stream. The final purification stage may be configured such that for example traces of $CO_2$ may be removed by a suitable process such as temperature swing adsorption. The type and concentrations of the possible impurity components may vary. It may therefore be possible to purify one or both streams separately before combination, or alternatively to purify the combined stream jointly, if for example the impurities are very similar. The fine purification often employs comparatively costly solid adsorbents; the gas stream to be treated should therefore ideally be as small as possible and the concentration of the components to be removed as high as possible.

An eleventh aspect of the process according to the invention is characterized in that the hydrogen-enriched permeate stream is compressed before supplying to the second hydrogen enrichment stage.

In a further aspect the plant according to the invention is characterized in that the means for dividing the raw synthesis gas stream and the means for dividing the acidified synthesis gas stream are constituted such that the proportion 1 and/or the proportion 2 can be chosen such that the molar $H_2/CO$ ratio required for the synthesis gas product stream is obtained. This allows the composition of the synthesis gas product to be altered and adjusted in targeted fashion, for example to produce an oxo gas having a predefined composition.

In a further aspect the plant according to the invention is characterized in that it further comprises means for dividing the carbon monoxide-containing residual gas stream and means for introducing a proportion 3 of residual gas stream into the synthesis gas product stream, wherein the means are constituted such that the proportion 1 and/or the proportion 2 and/or the proportion 3 can be chosen such that the molar $H_2/CO$ ratio required for the synthesis gas product stream is obtained. This also allows the composition of the synthesis gas product to be altered and adjusted in targeted fashion, for example to produce an oxo gas having a predefined composition.

In a further aspect the plant according to the invention is characterized in that it further comprises means which allow the carbon monoxide-containing residual gas stream to be compressed before supplying to the synthesis gas product stream. This makes it possible to achieve disposal and material utilization of a residue stream.

In a further aspect the plant according to the invention is characterized in that it further comprises means which allow the carbon monoxide-containing residual gas stream to be subjected to a fine purification before supplying to the synthesis gas product stream or subjected to a joint fine purification after supplying to the synthesis gas product stream. The final purification stage may be configured such that for example traces of $CO_2$ may be removed by a suitable process such as temperature swing adsorption. The type and concentrations of the possible impurity components may vary. It may therefore be possible to purify one or both streams separately before combination, or alternatively to purify the combined stream jointly, if for example the impurities are very similar. The fine purification often employs comparatively costly solid adsorbents; the gas stream to be treated should therefore ideally be as small as possible and the concentration of the components to be removed as high as possible.

BRIEF DESCRIPTION OF THE DRAWINGS

Developments, advantages and possible applications of the invention are also apparent from the following description of exemplary embodiments and the drawings. All the features described and/or shown in images, alone or in any combination, form the invention, irrespective of the way in which they are combined in the claims or the dependency references therein.

In the figures.

DETAILED DESCRIPTION OF THE INVENTION

FIGS. 1 to 4 are in the form of block flow diagrams which show the essential functional blocks and important connection conduits between these without showing individual fittings and equipment parts such as for example heat exchangers, heaters, coolers, valves, mixing apparatuses, connecting apparatuses, dividing apparatuses, pumps, blowers and compressors separately. A person skilled in the art will be able to select and dimension fittings and equipment parts with reference to his knowledge of the art via general requirements for the respective function block and/or subsequent specific requirements. The same applies for any required auxiliary streams, for example the steam required as a reaction partner in CO conversion.

Figure 1:
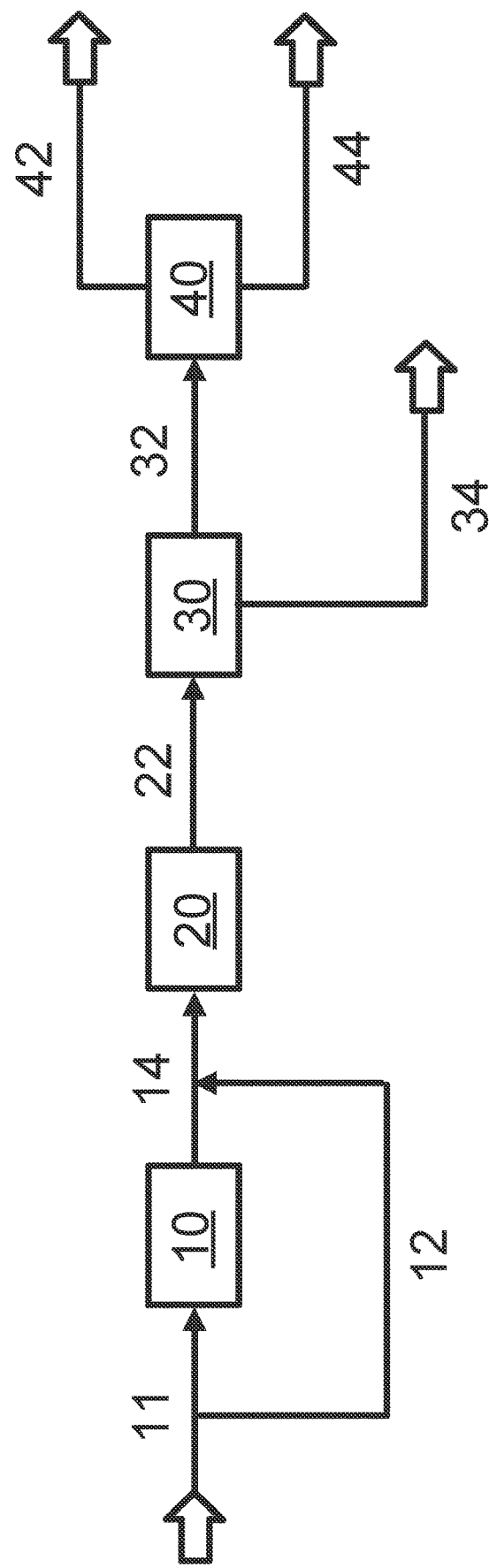
FIG. 1 is a first example of a process/a plant for producing an oxo gas according to the prior art.

In the block flow diagram shown in FIG. 1 according to a first example of the process/of the plant according to the prior art, conduit 11 passes a proportion of a raw synthesis gas produced for example using a synthesis gas production plant (not shown) which is configured as a steam reforming stage, as an autothermal reforming stage, as a partial oxidation stage or as a combination of at least two of the abovementioned synthesis gas production stages to a CO conversion plant 10 comprising at least one CO conversion stage and introduces it into said stage. The CO conversion plant converts the introduced proportion 1 of the crude synthesis gas stream under CO conversion conditions into a converted synthesis gas stream which is subsequently discharged from the CO conversion plant via conduit 14. The conduit 12 arranged as a bypass is used to run the remaining proportion of the raw synthesis gas past the CO conversion plant and directly into the conduit 14.

The mixed gas stream obtained from converted synthesis gas and unconverted raw synthesis gas is introduced via conduit 14 into a sorption apparatus 20 for removal of acidic gas constituents, especially carbon dioxide and hydrogen sulfide, by means of a physical or chemical sorption process. This may be configured for example as a gas scrubbing with cryogenic methanol as the absorbent/scrubbing medium according to the Rectisol process known per se. Conduit 22 then effects discharging of a deacidified synthesis gas stream from the sorption apparatus and introduction into a plant for cryogenic gas fractionation 30.

The plant for cryogenic gas fractionation, which may be configured as a liquid methane scrubbing or as a partial condensation for example, effects separation of a synthesis gas product stream, for example an oxo gas stream, which via conduit 34 may be discharged from the process/the plant and sent for subsequent storage, treatment or further processing (not shown). The cryogenic gas fractionation further affords a hydrogen-enriched synthesis gas stream which is supplied via conduit 32 to a pressure swing adsorption plant 40.

The pressure swing adsorption plant effects resolution of the hydrogen-enriched synthesis gas stream into a pure hydrogen product stream which may be discharged from the pressure swing adsorption plant as a further product stream via conduit 42 and sent for subsequent storage, treatment or further processing (not shown). Also obtained is a residual gas stream which still comprises carbon monoxide and possibly methane, argon and further impurities. Said stream is discharged from the pressure swing adsorption plant via conduit 44 and may be sent for subsequent storage, treatment or further processing (not shown). Due to its heating value it is often utilized as a fuel gas stream and for example supplied to the synthesis gas production plant.

The disadvantage of the process shown in FIG. 1 is the use of the costly and high-complexity cryogenic fractionation process. Altering the composition of the synthesis gas product is possible only with difficulty and within narrow limits and necessitates deep interventions into the cryogenic gas fractionation.

Figure 2:
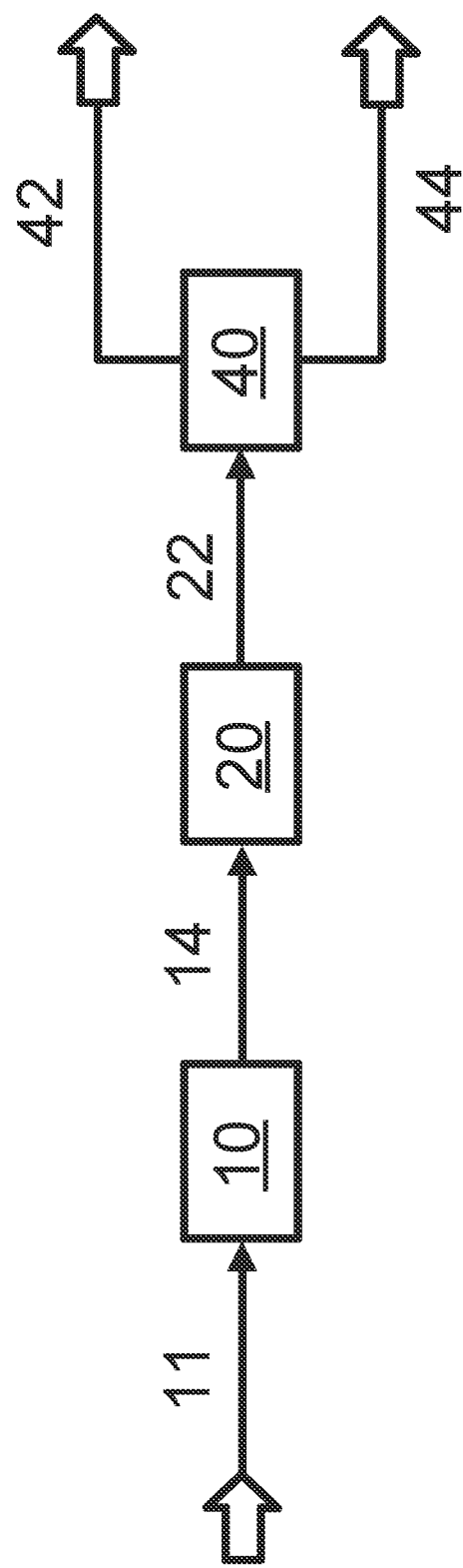
FIG. 2 is a second example of a process/a plant for producing an oxo gas according to the prior art.

In the block flow diagram shown in FIG. 2 according to a second example of the process/of the plant according to the prior art, conduit 11 passes the entirety of the raw synthesis gas produced for example using a synthesis gas production plant (not shown) which is configured as a steam reforming stage, as an autothermal reforming stage, as a partial oxidation stage or as a combination of at least two of the abovementioned synthesis gas production stages to a CO conversion plant 10 comprising at least one CO conversion stage and introduces it into said stage. This exemplary embodiment lacks a bypass past the CO conversion plant.

The CO conversion plant converts the crude synthesis gas stream under CO conversion conditions into a converted synthesis gas stream which is subsequently discharged from the CO conversion plant via conduit 14. Depending on the configuration and performance of the CO conversion, it is possible to achieve a complete or partial conversion of CO to $H_2$ and $CO_2$ and there are therefore certain adjustment possibilities for the $H_2/CO$ ratio to be achieved in the synthesis gas product.

The converted raw synthesis gas stream is introduced via conduit 14 into a sorption apparatus 20 for removal of acidic gas constituents, especially carbon dioxide and hydrogen sulfide, by means of a physical or chemical sorption process. This may be configured for example as a gas scrubbing with cryogenic methanol as the absorbent/scrubbing medium according to the Rectisol process known per se. Conduit 22 then effects discharging of a deacidified synthesis gas stream from the sorption apparatus and introduction into a pressure swing adsorption plant 40.

The pressure swing adsorption plant effects resolution of the hydrogen-enriched synthesis gas stream into a pure hydrogen product stream which may be discharged from the pressure swing adsorption plant as a product stream via conduit 42 and sent for subsequent storage, treatment or further processing (not shown). Also obtained is a synthesis gas product stream which is discharged from the pressure swing adsorption plant via conduit 44 and may be sent for subsequent storage, treatment or further processing (not shown). Due to its heating value it is often utilized as a fuel gas stream and for example supplied to the synthesis gas production plant.

The disadvantage of the process shown in FIG. 2 is that due to the low operating pressure of the PSA, the synthesis gas product, for example oxo gas, is obtained at low pressure and must be compressed for subsequent use. Furthermore, purity requirements for the synthesis gas product are often not achievable since it is obtained essentially as a waste product of the PSA and the cyclic operation of the PSA often leads to temporal fluctuations in the composition of the synthesis gas product. Finally, low availability of the synthesis gas product due to the combination of a PSA and a compressor is also a disadvantage.

Figure 3:
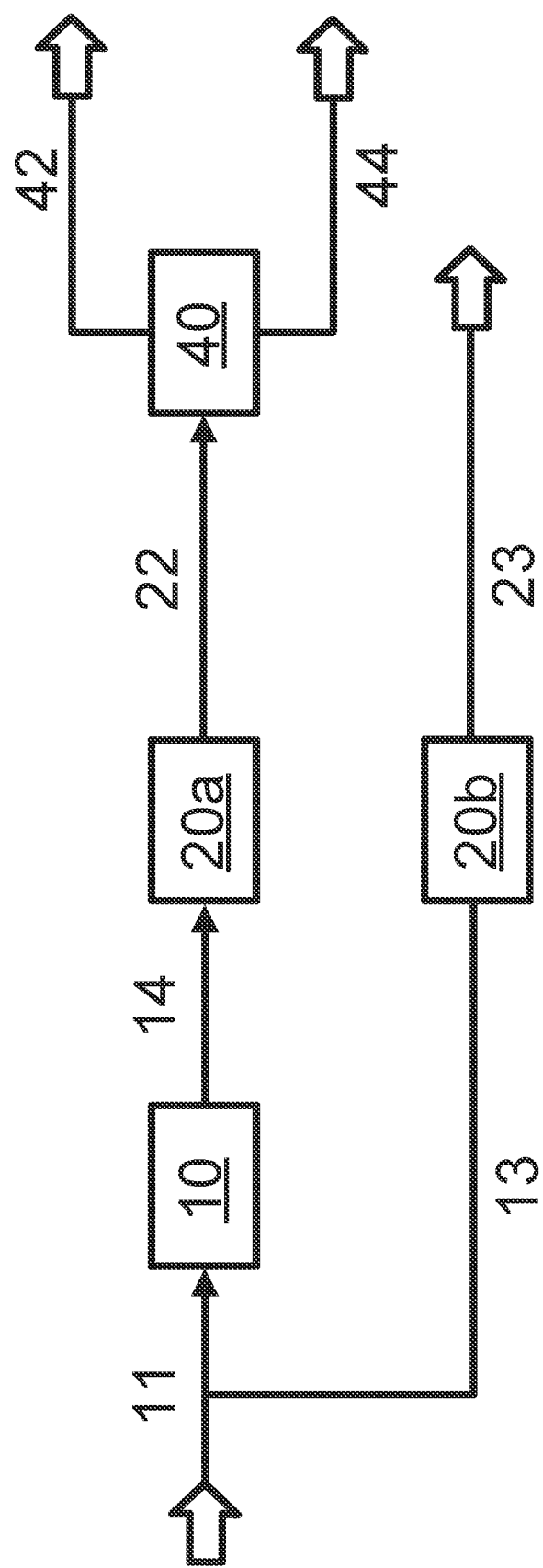
FIG. 3 is a third example of a process/a plant for producing an oxo gas according to the prior art.

In the block flow diagram shown in FIG. 3 according to a third example of the process/of the plant according to the prior art, a raw synthesis gas produced using a synthesis gas production plant (not shown), which is configured, for example, as a steam reforming stage, as an autothermal reforming stage, as a partial oxidation stage or as a combination of at least two of the abovementioned synthesis gas production stages, is divided into two proportions which are sent on via the conduits 11 and 13. Via conduit 11 the first proportion is passed to a CO conversion plant 10 comprising at least one CO conversion stage and introduced into said plant. The CO conversion plant converts the introduced proportion of the crude synthesis gas stream under CO conversion conditions into a converted synthesis gas stream which is subsequently discharged from the CO conversion plant via conduit 14 and introduced into a first sorption plant 20a. The remaining unconverted proportion of the raw synthesis gas stream is introduced via conduit 13 into a second sorption plant 20a.

The first and second sorption apparatuses 20a, 20b effect removal of acidic gas constituents, in particular carbon dioxide and hydrogen sulfide, using a physical or chemical sorption process. The sorption apparatuses may be configured for example as a gas scrubbing with cryogenic methanol as the absorbent/scrubbing medium according to the Rectisol process known per se. Conduit 22 then effects discharging of a converted, deacidified synthesis gas stream from the sorption apparatus 20a and introduction into a pressure swing adsorption plant 40. By contrast, an unconverted, deacidified synthesis gas stream is discharged from the process from the sorption apparatus 20b via conduit 23 and may be sent for subsequent storage, treatment or further processing (not shown), for example as oxo gas.

The pressure swing adsorption plant effects resolution of the converted, deacidified synthesis gas stream into a pure hydrogen product stream which may be discharged from the pressure swing adsorption plant as a further product stream via conduit 42 and sent for subsequent storage, treatment or further processing (not shown). Also obtained is a synthesis gas product stream which is discharged from the pressure swing adsorption plant via conduit 44 and may be sent for subsequent storage, treatment or further processing (not shown). Due to its heating value it is often utilized as a fuel gas stream and for example supplied to the synthesis gas production plant.

Disadvantages of the process shown in FIG. 3 are especially the specifically high capital costs for the treatment of the synthesis gas product stream, in particular for parallel operation of two sorption plants, and moreover in the case of coproduction of a small amount of the synthesis gas product in addition to large amounts of pure hydrogen. There is only limited flexibility to vary the product quantities and there is no direct option for influencing the $H_2/CO$ ratio in the synthesis gas product. Further disadvantages include the high complexity of the process chain and the considerable costs resulting from measures for ensuring a high availability of the synthesis gas product.

Figure 4:
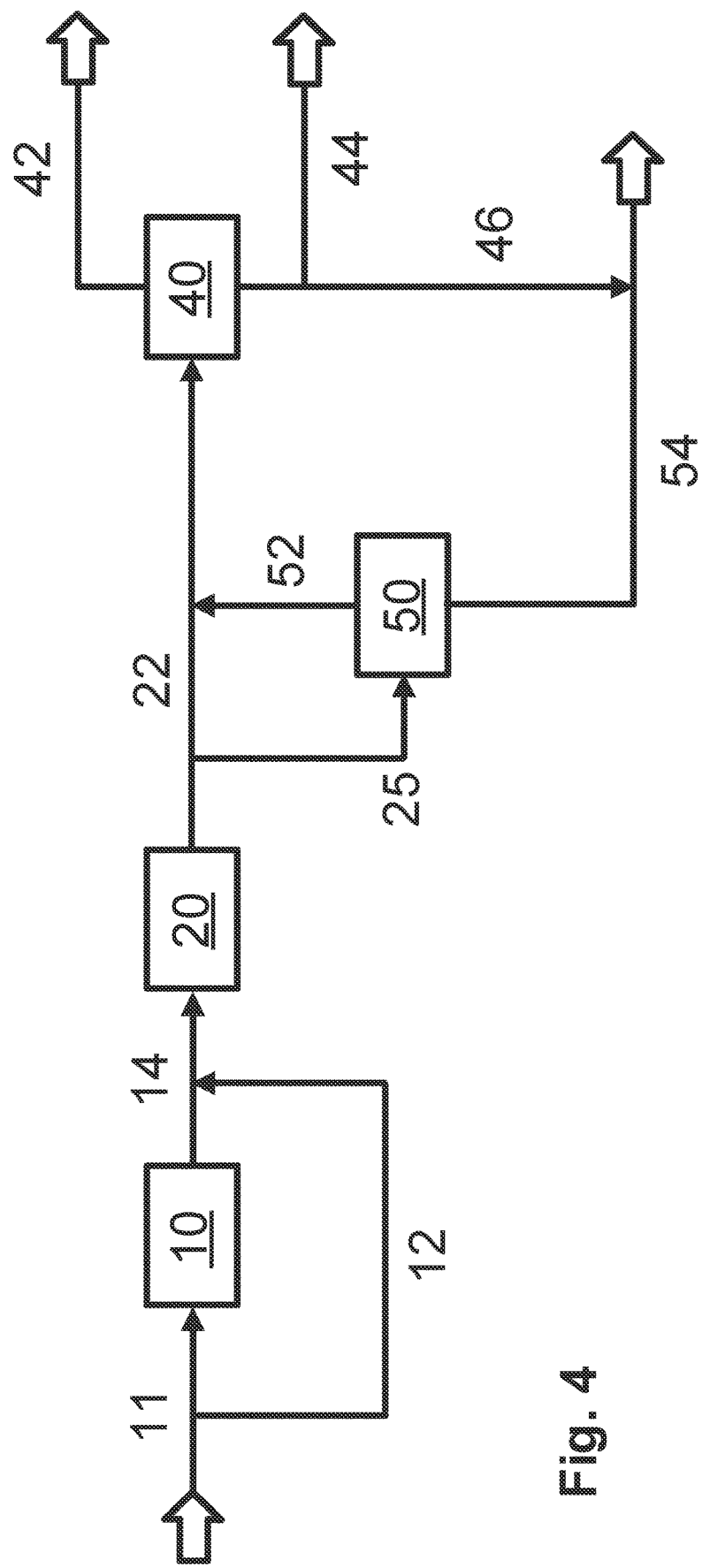
FIG. 4 is an exemplary embodiment of a process/a plant according to the invention for producing an oxo gas.

FIG. 4 now shows an exemplary embodiment of a process/a plant according to the invention for producing a synthesis gas product stream having an adjustable $H_2/CO$ ratio, especially an oxo gas, and a pure hydrogen stream. In the block flow diagram shown, conduit 11 passes a proportion 1 of a raw synthesis gas produced for example using a synthesis gas production plant (not shown), which is configured, for example, as a steam reforming stage, as an autothermal reforming stage, as a partial oxidation stage or as a combination of at least two of the abovementioned synthesis gas production stages, to a CO conversion plant 10 comprising at least one CO conversion stage and introduces it into said stage.

In addition to other considerations the configuration of the synthesis gas production plant should also be guided by the desired quantity ratio of the synthesis gas product stream and the pure hydrogen stream and by the desired $H_2/CO$ ratio of the synthesis gas product stream. When a large amount of a synthesis gas product to be employed as an oxo gas is required, noncatalytic partial oxidation is especially suitable on account of the produced raw synthesis gas having a high CO content.

The CO conversion plant converts the introduced proportion 1 of the crude synthesis gas stream under CO conversion conditions into a converted synthesis gas stream which is subsequently discharged from the CO conversion plant via conduit 14. The conduit 12 arranged as a bypass is used to run the remaining proportion of the raw synthesis gas past the CO conversion plant and directly into the conduit 14.

The mixed gas stream obtained from converted synthesis gas and unconverted raw synthesis gas is introduced via conduit 14 into a sorption apparatus 20 for removal of acidic gas constituents, especially carbon dioxide and hydrogen sulfide, by means of a physical or chemical sorption process. This may be configured for example as a gas scrubbing with cryogenic methanol as the absorbent/scrubbing medium according to the Rectisol process known per se. Conduit 22 then effects discharging of a deacidified synthesis gas stream from the sorption apparatus and introduction into a pressure swing adsorption plant 40. However, prior to this a proportion 2 of the deacidified synthesis gas stream is discharged via conduit 25 into a first hydrogen enrichment stage 50 containing a hydrogen-selective membrane as the separating means. The first hydrogen enrichment stage effects resolution of the deacidified synthesis gas stream into a hydrogen-enriched permeate stream which is discharged via conduit 52 and, jointly with the deacidified synthesis gas stream conducted in conduit 22, introduced into the pressure swing adsorption plant and into a hydrogen-depleted retentate stream which is discharged from the process via conduit 54 as a synthesis gas product stream and may be sent for subsequent storage, treatment or further processing (not shown). This synthesis gas product stream is especially sent to a subsequent plant for oxo synthesis (not shown).

The pressure swing adsorption plant effects resolution of the hydrogen-enriched synthesis gas stream into a pure hydrogen product stream which may be discharged from the pressure swing adsorption plant as a further product stream via conduit 42 and sent for subsequent storage, treatment or further processing (not shown). Also obtained is a residual gas stream which still comprises carbon monoxide and possibly methane, argon and further impurities. Said stream is discharged from the pressure swing adsorption plant via conduit 44 and may be sent for subsequent storage, treatment or further processing (not shown). Due to its heating value it is often utilized as a fuel gas stream and for example supplied to the synthesis gas production plant.

Establishment of the molar $H_2$/CO ratio required for the synthesis gas product stream is made possible by appropriate selection of the proportion 1 and/or the proportion 2.

However, it is also possible to pass a proportion 3 of the carbon monoxide-containing residual gas stream into the synthesis gas product stream and to choose the proportion 1 and/or the proportion 2 and/or the proportion 3 such that the $H_2$/CO ratio required for the synthesis gas product stream is obtained. This allows the composition of the synthesis gas product to be altered and adjusted finely and in targeted fashion, for example to produce an oxo gas having a predefined composition. This embodiment is advantageous especially when the residual gas stream comprises only a small proportion of impurities such as $CO_2$, methane or argon. These impurities may optionally be removed using one or more purification stages (not shown) to ensure that the purity specifications for the oxo gas can be observed.

Numerical Examples

The table which follows summarizes the compositions of individual material streams and their total quantity flows and pressures for an inventive process/a corresponding plant according to FIG. 4.

In the present numerical example a raw synthesis gas stream of about 14 000 kmol/h having an $H_2$ content of about 40 mol % and a CO content of about 52 mol % affords the following product streams: a pure hydrogen stream of about 9800 kmol/h having an $H_2$ content of 99.9 mol %, an oxo gas stream of about 1000 kmol/h having an $H_2$ content and a CO content of about 48 mol % each, a fuel gas stream of about 1900 kmol/h having an $H_2$ content of about 74 mol % and a CO content of about 25 mol %.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

LIST OF REFERENCE NUMERALS

[10] CO conversion plant
[11]-[14] Conduit
[20] Sorption apparatus
[20a] Sorption apparatus
[20b] Sorption apparatus
[22]-[23] Conduit
[25] Conduit
[30] Plant for cryogenic gas fractionation
[32] Conduit
[34] Conduit
[40] Pressure swing adsorption plant
[42] Conduit

[44] Conduit
[46] Conduit
[50] Membrane separation plant
[52] Conduit
[54] Conduit

TABLE

Material streams and compositions
for inventive exemplary embodiment according to FIG. 4

| Conduit No. | | 11 | 14 | 22 + 25 | 25 | 54 | 52 | 22 | 22 + 52 | 44 | 42 |
|---|---|---|---|---|---|---|---|---|---|---|---|
| From block No. | | PL | 10 | 20 | 20 | 50 | 50 | 20 | 20 + 50 | 40 | 40 |
| To block No. | | 10 | 20 | 40 | 50 | PL | 40 | 40 | 40 | PL | PL |
| H2 | mol % | 39.9 | 92.7 | 91.8 | 91.8 | 48.2 | 98.5 | 91.8 | 95.6 | 73.7 | 99.9 |
| CO | mol % | 51.9 | 5.0 | 7.7 | 7.7 | 48.2 | 1.5 | 7.7 | 4.1 | 25.2 | <10 ppm |
| CO2 | mol % | 5 | 34.6 | <10 ppm | <10 ppm | <10 ppm | <10 ppm | <10 ppm | <10 ppm | <10 ppm | 0.0 |
| CH4 | mol % | 0.3 | 0.2 | 0.3 | 0.3 | 1.9 | 0.0 | 0.3 | 0.1 | 0.8 | 0.0 |
| Remainder (N2, Ar) | mol % | 2.9 | 2.0 | 0.3 | 0.3 | 1.3 | 0.0 | 0.3 | 0.1 | 0.3 | 0.1 |
| Total stream "dry" | kmol/h | 14012 | 20284 | 12791 | 7720 | 1023 | 6698 | 5070 | 11765 | 1928 | 9839 |
| Pressure | barg | 54 | 50 | 48 | 48 | 46 | 20 | 48 | 48 | 0.5 | 47 |

PL = plant limits

REMARKS

Flow in conduit 42 (pure hydrogen): CO concentration<10 ppm according to pure hydrogen specification Flows in conduits 22, 25, 44, 52, 54: $CO_2$ concentration<10 ppm according to oxo gas specification

The invention claimed is:

1. A process for producing a synthesis gas product stream having an adjustable hydrogen-carbon monoxide ratio ($H_2$/CO ratio) and a pure hydrogen stream from an input stream containing hydrocarbons, comprising:
   (a) providing the input stream containing hydrocarbons;
   (b) supplying the input stream containing hydrocarbons to a synthesis gas production plant comprising:
      (b1) a steam reforming stage, or
      (b2) an autothermal reforming stage (ATR), or
      (b3) a partial oxidation stage (PDX), or
      (b4) a combination of at least two of the stages (b1) to (b3);
   (c) at least partial conversion of the input stream containing hydrocarbons in the synthesis gas production plant under synthesis gas production conditions to afford a raw synthesis gas stream containing hydrogen ($H_2$) and carbon monoxide (CO);
   (d) discharging a raw synthesis gas stream from the synthesis gas production plant;
   (e) introducing at least a first proportion of the raw synthesis gas stream into a CO conversion plant comprising at least one CO conversion stage, converting the proportion of the raw synthesis gas stream introduced into the CO conversion plant under CO conversion conditions to afford a verted synthesis gas stream, discharging the converted synthesis gas stream;
   (f) introducing the raw synthesis gas stream and/or the converted synthesis gas stream into a sorption apparatus for removal of acidic gas constituents using a physical or chemical sorption process, discharging a deacidified synthesis gas stream from the sorption apparatus;
   (g) introducing at least a second proportion of the deacidified synthesis gas stream into a first hydrogen enrichment stage containing a hydrogen selective membrane as the separating means, separating the deacidified synthesis gas stream into a hydrogen-enriched permeate stream and into a hydrogen-depleted retentate stream;
   (h) introducing the hydrogen-enriched permeate stream and the proportion of the deacidified synthesis gas stream not passed to the first hydrogen enrichment stage into a second hydrogen enrichment stage operating according to the principle of pressure swing adsorption (PSA);
   (i) discharging a pure hydrogen stream and a carbon monoxide-containing residual gas stream from the second hydrogen enrichment stage; and
   (j) discharging the hydrogen-depleted retentate stream from the first hydrogen enrichment stage as a synthesis gas product stream,
   wherein the first proportion and/or the second proportion are chosen such that the molar $H_2$/CO ratio required for the synthesis gas product stream is obtained.

2. The process according to claim 1, wherein the first proportion is between 0% and 100% of the raw synthesis gas stream and/or the second proportion is between 0% and 100% of the deacidified synthesis gas stream.

3. The process according to claim 1, wherein a third proportion of the carbon monoxide-containing residual gas stream is passed into the synthesis gas product stream and the first proportion and/or the second proportion and/or the third proportion are chosen such that the $H_2$/CO ratio required for the synthesis gas product stream is obtained.

4. The process according to claim 3, wherein the first proportion is between 0% and 100% of the raw synthesis gas stream and/or the second proportion is between 0% and 100% of the deacidified synthesis gas stream and/or the third proportion is between 0% and 100% of the carbon monoxide-containing residual gas stream.

5. The process according to claim 1, wherein the molar $H_2$/CO ratio of the synthesis gas product stream is between 10 and 0.1 mol/mol.

6. The process according to claim 1, wherein the raw synthesis gas stream less the first proportion is directly supplied to the sorption apparatus.

7. The process according to claim 1, wherein the deacidified synthesis gas stream less the second proportion is directly supplied to the second hydrogen enrichment stage.

8. The process according to claim 3, wherein the residual gas stream less the third proportion is discharged from the process as fuel gas.

9. The process according to claim 1, wherein the carbon monoxide-containing residual gas stream is compressed before supplying to the synthesis gas product stream.

10. The process according to claim 1, wherein the carbon monoxide-containing residual gas stream is supplied to a fine purification stage before supplying to the synthesis gas product stream or is supplied to a joint fine purification stage after supplying to the synthesis gas product stream.

11. The process according to claim 1, wherein the hydrogen-enriched permeate stream is compressed before supplying to the second hydrogen enrichment stage.

* * * * *